United States Patent [19]

Innes

[11] Patent Number: 5,508,875

[45] Date of Patent: Apr. 16, 1996

[54] SELF POWERED REMOTE TRIP INDICATOR

[75] Inventor: Mark E. Innes, Asheville, N.C.

[73] Assignee: Eaton Corporation, Cleveland, Ohio

[21] Appl. No.: 132,335

[22] Filed: Oct. 6, 1993

[51] Int. Cl.$^6$ ..................................................... H02H 3/00
[52] U.S. Cl. .............................................. 361/93; 361/94
[58] Field of Search .......................................... 361/93–95

[56] References Cited

U.S. PATENT DOCUMENTS 4,335,413  6/1982  Engel et al. ............................. 361/93

OTHER PUBLICATIONS

Westinghouse Electric Corporation, entitled "Advantage Control Modules: The Simplest Way To Control A Motor", dated Apr., 1993.
Westinghouse Electric Corporation, Instruction Manual, "Instructions for Advantage Control Modules Used with Full-Voltage Two–Speed Advantage Motor Starters and Contactors", dated Jun., 1993.

*Primary Examiner*—A. D. Pellinen
*Assistant Examiner*—Sally C. Medley
*Attorney, Agent, or Firm*—Martin J. Moran

[57] ABSTRACT

A self powered trip indicator remotely reads out parameters such as the type of trip detected in a contactor or motor starter circuit controllably coupling a power line to a load. The contactor circuit imposes signalling pulses on a trip status signal following a transition of the signal to a fault-indicating level, the pulses representing the parameters. The remote trip indicator derives operative power from the trip signal, and decodes the parameter from the pulses, using a decoder such as a counter to accumulate a binary multiple count of pulses, the result being indicated on LEDs coupled to outputs of the decoder. A switching circuit generates a short reset pulse to the counter at a leading transition following a pulse or level of a width exceeding a time limited by an RC combination coupled to the counter reset input. An RC timing circuit on the input side distinguishes the leading transition from other transitions by disabling a subsequent reset for a minimum time after generation of a first reset, during which time the pulses are counted and the result remains stable on the indicator LEDs. The circuit permits a reset after a longer duration between transitions, after which transitions defining shorter duration pulses represent a serial information signal.

20 Claims, 1 Drawing Sheet

SELF POWERED REMOTE TRIP INDICATOR

BACKGROUND OF THE INVENTION

1. Field of the Invention

The invention relates to control devices for contactors, motor starters and the like, which couple electrical power to loads. In particular, the invention concerns a trip indicator for signalling and preferably displaying the trip status of a single or multiple contactor/starter arrangement, remotely from the respective contactor or starter.

2. Prior Art

It is frequently necessary to develop a signal or indicator that represents the status of an electrical contactor or similar device. In a control system having a plurality of functionally related loads, or one or more loads that can be coupled to a power line in different configurations, for example, the status of a contactor or group of contactors may affect whether other contactors, controls, alarms or other devices should be activated or deactivated by associated switching means.

In a more specific example, an AC motor controllable for forward and reverse operation or for operation at different speeds typically is coupled to the power line (e.g., a three phase line) via two or more contactors. The respective contactors couple the motor windings to the line in different configurations as needed for the different functions. In the event that a problem occurs, such as a short circuit, a ground fault, excessive heat build up (thermal overload), phase imbalance or the like, one or both of the contactors will trip, thereby disabling the motor for the selected operation. It is desirable to signal and preferably to display the status of a contactor or starter at a remote location so that appropriate action can be taken or not taken, in view of the detected problem. Such action may involve action by maintenance personnel, in which case a simple and convenient display having indicators for the respective trip modes is advantageous. Preferably the display is located in a convenient place for viewing, which generally means a place remote from the contactor.

Error or trip conditions generally fall into one of several categories, such as short term over-current (i.e., short circuit), long term over-current (thermal overload), ground fault, phase imbalance, etc. A thermal overload trip may occur due to excessive current drawn through one or more windings of a mechanically overloaded motor. A thermal overload condition may build up over a long period of time if a motor is loaded too heavily. The appropriate triggering current setpoint for tripping in the event of a short term over-current is appropriately higher than for a long term overload, the long term setpoint being low and short in time enough to trip promptly in the event of a stalled motor or the like, but not so low or short that the contactor trips when a motor is first started, reversed, etc. in the normal course of operation.

A ground fault trip occurs if current sinking is detected through the system ground. Such a condition is potentially dangerous, and the trip setpoint is low. A phase imbalance trip occurs when there is an improper relationship among the phases of a multi-phase AC system.

An automatic control system that controls a plurality of loads by signalling contactors or that controls one load via one or more contactors advantageously can be made responsive to the trip status of the contactor(s). In a production environment, tripping of a contactor controlling a machine downstream along a process line may be arranged by appropriate remote signalling to trigger contactors upstream in the process to be switched off, or for appropriate action to be taken by production personnel. A control system for effecting related switching may be more or less complex, and may include a relay ladder arrangement, a programmable controller or other device. In a basic control system comprising two or more contactors, the trip signal developed by one of the contactors is typically cascaded through other contactors such that if any of the contactors trips, all the contactors switch off.

This presents a maintenance problem. In the event that a problem occurs such as a short circuit, thermal overload, ground fault or phase imbalance, one or more of the contactors detects the condition, generates an error signal, decouples its load from the line and triggers any cascaded contactors to trip. Often the error signal is also used to generate a bell alarm. Although the system has thereby been protected from damage, and the operators have been alerted, the cause of the error condition still must be determined so that appropriate corrective action can be taken. However, in this basic system as described, the operator may be uncertain as to which contactor generated the error signal, and why.

One alternative is to reset the contactors and hopefully to generate the fault condition again, this time observing operation of the loads and perhaps applying test equipment to isolate the cause of the fault. This is disadvantageous for a number of reasons. The fault condition may be due to an intermittent occurrence, such as brief current overloading when two motors happen to be started or reversed at the same time. Such a fault may not reoccur on resetting the system and may be simply a nuisance trip of no consequence.

On the other hand, the fault condition may be due to an electrical failure of substantial consequence. Recoupling the power in the event of a direct short of the line on the load side of the contactor, for example, could damage the load or the line, or could cause a protective device more proximal to the power source to trip. Recoupling the power in the event of a ground fault or phase imbalance may present a danger of electrocution. For all these reasons, simply resetting the system or any individual contactor is not recommended until the initiating contactor and the reason for the trip are identified, and corrective action is taken if necessary.

It is possible without resetting to determine the nature of an electrical fault and to localize the contactor that most likely initiated a trip, for example using a multimeter or the like to test resistance or continuity among various terminals and ground, in short to verify all the wiring and the condition of the load devices. If such action is taken, and no electrical fault is found, uncertainty remains as to whether a nuisance fault occurred and can be ignored, or whether a real problem exists but was inadvertently overlooked. Testing a system sufficiently that the operator is confident can be difficult and time consuming.

It would be possible to provide additional instrumentation, mechanical devices, memory storage elements or similar means associated with the contactors that enable a technician to determine the location and cause of a trip condition. It would also be possible to provide metering elements and/or recording devices that can be checked to determine the operating parameters of the power distribution system and the load, allowing the source and type of fault to be deduced. These alternatives are expensive. Moreover, as a practical matter, the operator may be willing to take the chance that a trip was a nuisance trip rather than a fault of consequence, especially if nuisance trips are not unusual, rather than to take the time to ring out the circuits, to check any instrumentation, recording elements or the like, or even to open the cabinets housing the starters to view any mechanical or electrical indicators therein. What is needed is an inexpensive and convenient means for generating and storing an indication of the source and type of trip, at a location remote from the contactor or motor starter, and preferably without adding any substantial circuitry or instrumentation to the standard contactor.

Some systems provide a status display associated with a controller arranged to communicate with one or more contactors. The display is operable to indicate the contactor status, and therefore the load circuit status, of associated contactors. The Westinghouse Electric Corporation ADVANTAGE™ line of control modules provide a status display of this description, the display comprising colored LEDs. The status light colors are chosen such that normal operations such as "run" use green indicators while trip indicators such as thermal overload, or phase imbalance use red. In one arrangement of the ADVANTAGE control module, blinking of particular lights that normally are used to indicate "run," "stop" and similar modes, or trip status, are blinked to signal the operational status of up to four associated contactors. A display of this type on a control module is helpful to localize the source of a trip, at least to the level of the group of contactors coupled to the control module. The control module comprises a microprocessor that tests the operability of communications with the contactors in addition to controlling the contactors to achieve coordinated operation. The controller is typically located inside a cabinet adjacent the contactors it services.

It would facilitate maintenance procedures to provide trip status indicators in locations remote from the controller. In different applications, the starters or contactors and their controller may located together or apart from one another and from the loads being controlled. In order for a technician to determine the cause of a trip, the appropriate controller must be located before the trip status can be read.

For safety and practical reasons, it would be advantageous to provide means such as an indicator circuit, responsive to a trip status of a contactor or the like, particularly for use with contactors coupled to a control module such as the ADVANTAGE control module. It would furthermore be desirable that such a device be inexpensive and simple, providing a means for indicating or otherwise responding to a trip source and type, that can be placed remote from the contactor circuits, and does not require the addition of extensive supporting circuitry, power supplies and logic elements.

SUMMARY OF THE INVENTION

It is an object of the invention to provide a means for signalling and responding remotely to the trip status of a contactor circuit, associated with the trip signal line and the contactor reset input line, and that imposes signalling information on the trip signal and decodes the information remotely, for example to control operation of indicators or other devices as a function of the information.

It is also an object of the invention to provide a remote trip indicator for displaying the trip status of a contactor circuit in an easy to read fashion, remote from the means for generating a signal representing trip status.

It is another object of the invention to provide a remote trip indicator that obtains all necessary power from the signal lines to which it is coupled.

It is also an object of the invention to provide a remote trip indicator that uses available signals associated with a contactor controller, including a digitally varying trip status signal and an AC coupled reset.

It further an object of the invention to provide a remote trip indicator to achieve the foregoing objects with a minimum of complexity and expense.

These and other objects of the invention are accomplished according to the invention by a trip indicator coupled to a contactor circuit, operable to control motors or similar loads. The trip indicator preferably is remote from the controller or contactor associated with it and is coupled to an externally generated trip signal. The trip signal provides power and signalling information to the trip indicator simultaneously. The signalling information is in the format of serial digital pulses having a variable number of pulses of distinct widths, the pulse signal representing one of a plurality of trip status conditions at the contactor such as thermal overload, phase imbalance, etc.

The trip indicator comprises an input circuit having a diode and a capacitor in series, the input circuit being coupled in parallel across the trip signal and a reset input of the device that generates the trip pulse signal. The capacitor accumulates a charge when the trip signal is high, and delivers charge for powering the trip indicator circuity during the short times the trip signal goes low due to pulses. The capacitor and diode thereby define a power supply capable of powering the trip indicator circuitry, for a limited duration, regardless of the logic stare of the trip signal.

The trip indicator includes a reset circuit coupled to the trip signal. The reset circuit has two distinct operative states, a hold state and a trip state. Switching from one operative state to the other is controlled by the logic level and pulse width of the trip signal. The reset circuit is operable to generate a reset signal coincident with the reset circuit entering the trip state, differentiating and inverting the leading transition on the trip signal to generate an immediate reset. The reset signal is coupled to the reset input of a decoding circuit, thereby clearing the decoder in preparation for pulses to be output on the trip signal line by the controller or contactor circuit.

The decoder can be a counter that accumulates a count of positive edge transitions of the trip signal during the period of time the reset circuit remains in the trip state. In that case the number of positive edge transitions preferably is a binary multiple representing a particular trip status such as a thermal overload, ground fault, phase imbalance or the like. The counter outputs are coupled to drive LEDs such that the each bit of the counter output represents a separate trip status condition such as a thermal overload or phase imbalance. It is also possible to use other forms of decoders such as gating arrays that decode data from the outputs of a counter, flip-flop arrangement, shift register or the like. The decoded outputs can also be used for various purposes related to signalling, in addition to the operation of indicators such as signal lights. For example, one or more devices such as relays or switches can be controlled from the decoded outputs, the data can represent numeric data passed from the device to other devices in a hierarchy of controlled and controlling devices, and other such uses of the signalling path can be made.

The reset circuit switches back to the hold state once the trip signal goes high and remains high for a predetermined period of time, in which event the counter outputs remain stable, displaying the most recent trip status until the reset circuit enters the trip state again and the counter outputs are cleared on the leading edge of the trip signal. The trip indicator thereby provides an easy means for signalling, for example to provide a visual indication for display of trip status (the user need not interpret blink patterns or the like). Although the signalling is done over the single trip signal channel, the trip circuits remain operational because the signalling pulses imposed on the trip signal are short enough that the trip circuits do not respond. No external power supply is needed because all circuitry is powered from the trip signal. The circuit is simple and effective.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
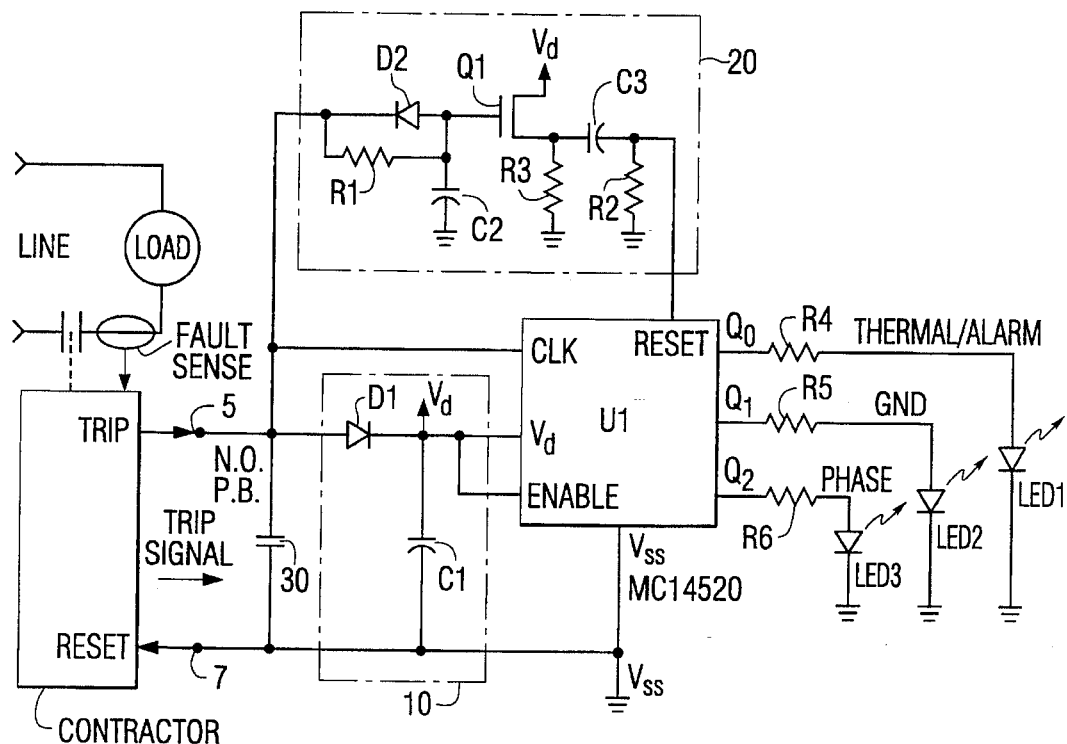
FIG. 1 is a schematic circuit diagram showing a trip status indicator according to the invention.

Referring to the schematic diagram of FIG. 1, the trip indicator according to the invention is shown in a preferred embodiment. The trip indicator has two input terminals 5, 7 that are coupled to the trip output and the reset input of a contactor circuit such as a Westinghouse Electric Corporation ADVANTAGE™ control module or the like, and are coupled to an input circuit 10 of the trip indicator. The trip signal at positive input terminal 5 is normally low, i.e., when the contactor circuit has not switched into the trip state or when there is no data to display or signal. The trip signal goes high during a trip or as a prelude to a signalling pulse stream. In the event of a trip, the trip output goes low, first for a longer (wider) low-going pulse, and then for a variable number of shorter low-going pulses representing serial data.

Generally, the trip signal at terminal 5 couples current to power counter U1 by charging capacitor C1. A timed switching circuit 20 (reset circuit) discriminates for pulses of predetermined width, which pulses either reset the decoder U1, which can be a counter or the like, or cause the decoder to change state. In the event the decoder is a counter, the state change involves advancing from one count to the next on each pulse. For other forms of decoders such as shift register or flip-flop arrangements, other state changes are possible. The pulses in the embodiment shown are decoded to drive unique output indicator lights LED1-LED3 for each binary power, $2^0$, $2^1$ and $2^2$. For a larger number of unique outputs, a counter capable of additional powers of two can be used, or a decoding arrangement wherein a combination of bits are decoded can be used, e.g., via a one-of-sixteen decoder coupled to four binary outputs.

Input circuit 10 has a series diode D1 and a parallel capacitor C1, the capacitor coupled between the $V_d$ positive voltage supply to the decoder U1 and terminal 7, which functions as the circuit ground $V_{ss}$. The input circuit 10 is powered from input terminals 5, 7, and forms a power supply where capacitor C1 is charged through diode D1 when the trip signal is high (positive voltage). Capacitor C1 is charged substantially to the peak voltage of the trip signal. Capacitor C1 supplies power to the counter or other decoder U1 and the reset circuit 20. Capacitor C1 has sufficient capacitance that adequate power is delivered to the trip indicator circuitry during the limited times the trip signal is low (no voltage). When the trip signal transitions from high to low, diode D1 becomes reversed biased, thereby preventing capacitor C1 from discharging back toward terminal 5. Diode D1 is chosen such that its leakage (reverse biased) current is small compared to the current delivered to the remaining circuitry, thereby minimizing discharge of capacitor C1.

The circuit as shown couples the trip output of the starter to the reset input of the starter, and a main purpose of this is to couple either a trip indication from the trip output to the reset input, or to couple a reset signal via a manual pushbutton 30 to the reset input. According to the invention, transitions on the trip signal also are applied via reset circuit 20 for resetting the trip indicator decoder. Normally open manual pushbutton switch 30 shorts lines 5 and 7 together, coupling the trip output of the controller (e.g., starter) to the reset input of the controller, and also provides a pulse that may be coupled through to the reset input of counter U1, depending on pulse timing. According to one embodiment of circuit 20 as shown in FIG. 1, two RC charging circuits are disposed on the input and output sides of a switching transistor Q1. Each RC charging circuit defines an RC time constant, the circuit of R1-C2 forming an integrator and C3-R2 forming a differentiator.

The first charging circuit has a resistor R1 in series with a capacitor C2, whereby the voltage on capacitor C2 rises to the maximum voltage of the trip signal according to the factor $\epsilon^{-t/RC}$ following a rising transition on the trip input at terminal 5. Transistor Q1 is a P-channel FET, having a gate coupled to capacitor C2. When the trip input goes low, capacitor C2 is discharged rapidly through diode D2. Transistor Q1 then conducts, coupling the supply voltage $V_d$ to capacitor C3 on the drain or output of transistor Q1. Thus, diode D2 and transistor Q1 form a negative edge-triggered switch.

The second RC timing circuit comprises resistor R2 and capacitor C3. The capacitor C3 is in series between transistor Q1 and the reset input of counter Q1. When Q1 begins to conduct, capacitor C3 is not yet charged, and accordingly the voltage $V_d$ is coupled to the reset input of the decoder or counter U1. Capacitor C3 charges at a time constant defined by resistor R2 and capacitor C3. Resistor R3 is provided to discharge the second charging circuit when transistor Q1 turns off (not conducting). The normally low output at the junction of C3 and R2 thereby defines a reset signal that provides a pulse to reset decoder or counter U1.

Operation of the circuit is as follows. When the trip signal at input terminal 5 is high for a period of time exceeding five times the time constant of resistor R1 and capacitor C2, capacitor C2 is substantially fully charged, switching transistor Q1 off. When the trip signal subsequently transitions from high to low, thereby forming a negative edge, the first charging circuit rapidly discharges though diode D2, and switching transistor Q1 is forced into conduction. The reset signal, at the junction of capacitor C3 and resistor R2, is thus pulled high, because capacitor C3 is not yet charged, approaching the power supply voltage $V_d$. As capacitor C3 is charged through transistor Q1 and resistor R2, the voltage on the reset input falls off at the time constant of the second charging circuit of R2 and C3.

Assuming a positive transition occurs on the trip signal at terminal 5, the switching transistor Q1 remains in conduction until the trip signal has remained high for a period of time defined by the time constant of the first charging circuit of R1 and C2, namely until capacitor C2 has charged sufficiently through resistor R1 to turn off transistor Q1 (diode D2 being reverse biased).

The reset circuit 20 has two distinct operative states defined by the operation of the negative edge triggered switch. When the trip signal remains high for longer than the period of the first RC combination (R1-C2), the switching transistor is not conducting, and the reset circuit is in a hold state. When the reset circuit is in the hold state, the leading negative edge of the trip signal forces transistor Q1 into conduction and a reset signal is generated to initialize the decoder U1, e.g., to set a counter U1 to a count of zero. When Q1 is conducting the reset circuit is in a reset state, but the reset pulse is kept narrow by virtue of capacitor C3 becoming charged. Thus the decoder/counter U1 is not held in a reset state by continued conduction of transistor Q1. The reset circuit returns to the hold state, enabling a new reset to occur, only after the trip signal remains high for a sufficient period to charge capacitor C2 through resistor R1.

Once the circuit 20 is in the reset state as defined by conduction of transistor Q1, negative edge transitions on the trip signal do not cause additional reset signals to be generated at the input of decoder/counter U1, because Q1 remains in conduction. When the reset circuit is in this state, short low going pulses on the trip signal can be used for signalling. According to the embodiment shown, short pulses can be applied to change the state of the decoder/counter, provided the trip signal does not remain high for the period needed to charge capacitor C2.

It is also possible to omit resistor R1, capacitor C2 and diode D2, provided the signalling pulses are so fast as to cause the decoder/counter U1 to change state without allowing C3 to discharge to the point of an effective reset signal at the input of decoder/counter U1. The timing circuit of R1, C2 and D2 provide further protection from a reset to U1, and provide a strong negative edge triggering function.

In either case, it is possible to impose signalling transitions from high to low on the trip signal a substantial number of times as long as the trip signal does not remain high for the period needed to charge capacitor C2, about five times the time constant of R1 and C2, or as long as an effective reset cannot be generated by C3. As a further limitation, the pulses cannot proceed indefinitely because power supply capacitor C1 may otherwise discharge to below a level at which the circuit can continue to operate. Nevertheless, These short transitions can be used without causing an unwanted reset to the motor starter, and to encode a substantial quantity of signalling information.

In the event of a fault detected by the controller or contactor circuit coupled to terminal 5, such as a thermal overload or ground fault, the output of the controller or contactor typically begins to oscillate high and low as the current level detected wavers around the setpoint of triggering of the controller or contactor circuit, then goes high as the current level detected remains above the setpoint, triggering a trip at the reset input of the contactor circuit (e. g., motor starter), which resets the contactor circuit as it initializes in the protective, contacts-open state. However, according to the invention, the controller or contactor circuit is arranged to output signal pulses on the trip signal, in order to identify the nature of a trip and/or to encode other signalling information, such as an impending trip status (e.g., approaching the trip current threshold), or a deadman timer trigger that is output only while the contactor controller continues to operate properly. Also, after a trip has occurred, as shown by the trip signal remaining high for a predetermined period exceeding the time needed to charge capacitor C2 (which can be shorter than the time needed to reset and open the contactor by generation of an operational reset at terminal 7) the controller signals the indicator circuit in this manner.

Various specific signalling protocols and combinations are possible according to the invention, while remaining within the foregoing timing restraints. The signalling can involve repetitive signalling of the same information, or successive signalling of different types of data together with a header or footer portion identifying the data type. According to a preferred embodiment, the following forms of signalling are used:

1. "Contactor/controller operating properly" is a heartbeat or deadman timer form of signal which can be emitted at intervals, for example of four seconds. The trip signal is switched high for one half of a power cycle, and one of the signal lines (e.g., LED1) is blinked by encoding the corresponding count of one of the outputs (one for LED1 as shown).

2. "Start Diagnostics Result" is signalled upon completing preliminary stamp diagnostic checks (e.g., testing for acknowledgement signals from coupled contactor circuits to ensure they are connected and operative). A one-half to 4½ cycle high level is maintained on the trip output while blinking LED1 repetitively each half cycle.

3. "Thermal Alarm" uses an approximately one-third second high level on the trip output, with LED1 encoded to thereby blink on and off every one-third second.

4. "Ground Fault Alarm" is signalled by switching to a high trip output level and signalling to turn on LED2 approximately every one-sixth of a second, repetitively over ten cycles. This can occur when a ground fault is detected but the starter is not to be permitted to trip.

5. "Thermal Trip" is signalled by switching the trip signal to the high state and signalling one time to turn on LED1. The trip signal thereafter remains high and the contactor trips.

6. "Ground Trip" similarly is signalled by switching the trip signal to the high state and signalling one time to turn on LED2. The trip signal remains high and the contactor trips.

7. "Phase Unbalance Trip" is signalled in a multiphase system by switching the trip signal high and turning on LED3.

8. "Phase Loss Trip" is signalled in a multiphase system by switching the trip signal high and turning on LED4.

9. The operational status of the indicators can also be signalled by turning on all the LEDs, for example upon power-up. If the decoder is a counter, the foregoing signal types each use a binary multiple (1, 2, 4 or 8), and the indicators can be switched on by the appropriate sum (e.g., 15 or hex 'F' for four bits). Where a one-of-N decoding scheme or a series of flip-flops or the like are employed, the lights can be strobed sequentially or a separate switching technique employed to exercise all the lights.

The pulses to be counted or otherwise decoded are applied to the clock input of counter U1, powered from the trip signal by capacitor C1. The clock input of the counter U1 is positive edge triggered such that counter U1 counts the positive transitions on the trip signal, and each transition varies the decoder output (e.g., advances the count output by one count), having started at a predetermined state (e.g., a zero count) due to the reset signal from reset circuit 20. The decoder U1 has a plurality of outputs for identifying the state, three being shown, for example, in FIG. 1 as $Q_0$, $Q_1$ and $Q_2$ in the example of a binary counter for the decoder. The counter outputs are high true and are connected to respective LEDs, namely LED1, LED2 and LED3, via current limiting resistors R4, R5 and R6. The counter outputs have sufficient current source capability to illuminate the LEDs and provide a visible indication of the count representing the trip status.

The status as thereby identified can be more or less complicated, and preferably is arranged such that each LED corresponds uniquely to one type of trip fault, one particular contactor, etc. In the embodiment of FIG. 1, each LED represents a particular type of trip, namely a thermal overload (LED1), a ground fault (LED2) or a phase fault (LED3). It is also possible to assign other specific indications as discussed above, for example assigning each trip status to a binary code based on combinations of several counter outputs such as:

|  | $Q_2$ | $Q_1$ | $Q_0$ |
| --- | --- | --- | --- |
| Thermal trip | 0 | 0 | 1 |
| Ground trip | 0 | 1 | 0 |
| Phase trip | 0 | 1 | 1 |

However it is advantageous to assign each trip status type to an individual LED such as an LED triggered via a binary multiple count or the like, achieved intermittently (for example to show impending trip alarms) or steadily (to show the nature of a trip that has occurred), thereby allowing the status to be easily read by looking at a single LED rather than having to look up a numerical code. The device can be arranged with more or fewer outputs, states or sequences of signals, as needed to accommodate the desired number of possible indications.

The trip indicator has a normally open push button (push button) coupled across the input terminals 5, 7. The reset circuit is manually forced into the trip state when the push button is momentarily depressed. This has the same effect as an edge on the trip signal. A reset signal is generated and the decoder/counter is cleared. Assuming the controller or contactor circuit is continuing to output a high (trip) signal, the reset circuit returns to the hold state after the push button has been released for the time defined by R1 and C2.

Terminal 7 is coupled to the reset input of the controller or contactor circuit that is signalling to the indicator. Thus depression of pushbutton 30 shorts together the trip output and reset input of the controller or contactor circuit and resets the controller as well. The controller comes up in a protective state, with controlled contacts open. If desired to test the load circuits again. i.e., after correcting the fault identified by the indicator means of the invention, the user activates the run or start input of the controller or contactor circuit to re-engage power to the loads. Should the fault reoccur, the same process proceeds as discussed above.

Figure 2:
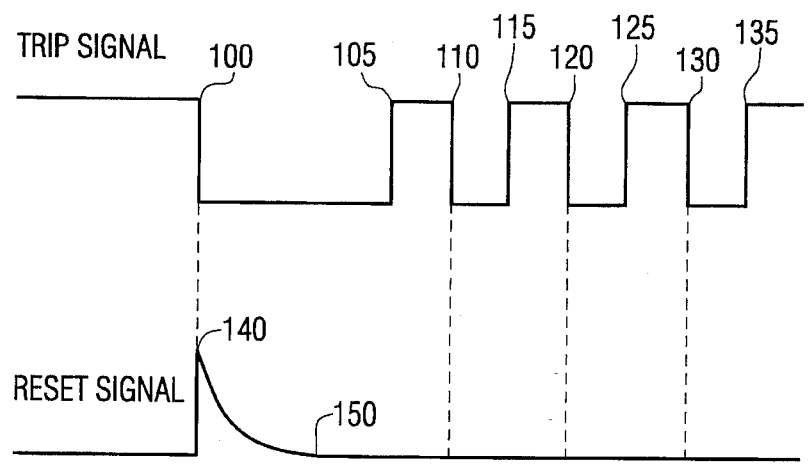
FIG. 2 is a timing diagram showing the timing relationship between the trip signal and the reset signal.

FIG. 2 shows a timing diagram of a typical trip signal in relation to the reset signal as generated by the reset circuit 20. Assuming that the trip signal has previously remained high for a period of time sufficient to charge capacitor C2, e.g., more than five time constants of R1 and C2, and now transitions from high to low, the reset signal occurs on the first negative edge 100. The first negative edge 100 discharges capacitor C2 through diode D2, forcing the reset circuit 20 into the reset state, and generating a high going reset pulse 140 by transistor Q1, capacitor C3 and resistor R2. The reset pulse decays exponentially to the low logic state 150 due to the second charging circuit. The first positive edge 105 of the trip signal occurs following the decay of the reset pulse to below the low logic threshold level of the counter reset input, thereby ensuring that counter U1 is not held in the reset state and that the counter is operable to count the first and subsequent positive edges of the trip signal. However, the period of time between negative transition 100 and positive transition 105 cannot exceed the length of time that power supply capacitor C1 can supply adequate power to the trip indicator circuit.

Subsequent positive edges of the trip signal, shown in FIG. 2 as 115, 125 and 135 advance the decoder state such as the counter output by one count each, and in the example shown the resulting counter output would be four (binary 100), whereby LED3 would be illuminated.

The negative transitions subsequent to the initial one, shown in FIG. 2 as 110, 120 and 130, do not generate a reset signal because the pulse width (e.g., the period of time from 105 to 110) is much less than the time needed to charge capacitor C2 through resistor R1. In the event the pulse width is very short, elements R1, C2 and D2 can be replaced with a direct connection between the gate of transistor Q1 and input terminal 5, because very short pulses will not allow capacitor C3 time to generate a reset to decoder U1. In any event, the reset circuit is caused to remain in the reset or counting state while the decoder advances to the desired state indicated by the pulse signal. The reset circuit returns to the hold state at a period of time defined by approximately five time constants following the last positive edge 135. The decoder/counter outputs remain at the previously accumulated state or count until the reset circuit enters the trip state and the counter is reset by a new low going input transition. Thus, although the contactor becomes tripped and reset, the nature of the respective trip remains visible on the indicators.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A self-powered indicator for a contactor circuit coupled to a signal line carrying a trip signal having an initial high level upon commencement of signalling, followed by a predetermined number of low going pulses encoding a status of the contactor circuit, the indicator comprising:

a capacitor coupled in parallel with the trip signal, the capacitor charging to a supply voltage from the trip signal during the initial high level of the trip signal;

at least one RC charging circuit coupled to a switching transistor powered from the supply voltage for turning on the switching transistor during the initial high level;

a reset circuit comprising a differentiator coupled to an output of the switching transistor, the differentiator generating a reset signal coincident with a first edge transition of the trip signal after the initial high level;

a decoder circuit powered from the supply voltage and coupled to the trip signal and to the reset signal, the decoder being cleared by the reset signal and being operable to decode the pulses on the trip signal to produce an output.

2. The self-powered indicator according to claim 1, further comprising means responsive to the decoder circuit, activated and deactivated as a function of the output of the decoder circuit.

3. The self-powered indicator according to claim 2, wherein the means responsive to the decoder circuit comprises at least one visible indicator and wherein the pulses represent a trip status of the contactor circuit.

4. The self-powered indicator according to claim 1, wherein the reset circuit is switchable between two distinct operative states in which the reset signal is respectively enabled and disabled, and wherein transition from one of said operative states to the other is controlled by a duration of a pulse on the trip signal.

5. The self-powered indicator according to claim 4, wherein the decoder circuit comprises a counter, the trip signal being coupled to a clock input of the counter, and the clock input being triggered by a transition opposite the leading transition to advance the counter, whereby the counter accumulates a count of pulses on the trip signal following the leading transition, and the at least one RC charging circuit defines a minimum delay between a last of the pulses and the leading transition.

6. The self-powered indicator according to claim 1, further comprising a series diode coupled between the trip signal and the supply voltage of the capacitor coupled in parallel with the trip signal, whereby said capacitor is blocked from discharging during the low going pulses.

7. The self-powered indicator according to claim 1, wherein the decoder circuit is responsive to edges of the pulses, and wherein the means responsive to the decoder circuit comprises visible indicators driven from a plurality of outputs of the decoder.

8. The self-powered indicator according to claim 1, wherein the decoder circuit comprises a plurality of outputs representing bits, and each of the bits indicates a distinct trip status.

9. The self-powered indicator of claim 1, wherein the differentiator has a time constant less than a duration of the low going pulses, whereby the low going pulses are blocked by the differentiator from generating the reset signal.

10. A contactor circuit arrangement for coupling a load to a power line, comprising:
    a contactor including controllable contacts for opening and closing at least one connection between the power line and the load, current sensing means operable to sense at least one fault condition involving one of the power line and the load and to output a trip signal having at least two distinct levels representing a status of the at least one fault condition, the trip signal having an initial high level upon commencement of signalling, followed by a predetermined number of low going pulses encoding a status of the contactor circuit;
    a self-powered trip indicator remote from the contactor, including a capacitor coupled in parallel with the trip signal, the capacitor charging to a supply voltage during the initial high level, a reset circuit comprising an RC charging circuit coupled to a switching transistor powered from the supply voltage for turning on the switching transistor during the initial high level, and a differentiator coupled to an output of the switching transistor, the differentiator generating a reset signal coincident with a first edge transition of the trip signal after the initial high level, a decoder circuit coupled to the trip signal and to the reset signal, the decoder being powered from the supply voltage, cleared by the reset signal and operable to decode the pulses on the trip signal, and, means responsive to the decoder circuit, activated as a function of the trip status of the contactor circuit.

11. The contactor circuit arrangement according to claim 10, wherein the reset circuit is switchable between two distinct operative states in which the reset signal is respectively enabled and disabled, and wherein transition from one of said operative states to the other is controlled by a duration of the low going pulses on the trip signal.

12. The contactor circuit arrangement according to claim 11, wherein the reset circuit and the differentiator each comprises an RC charging circuit having a time constant, the switching transistor being responsive to the RC charging circuit of the reset circuit for enabling and disabling the reset signal, and the RC charging circuit of the differentiator limits a pulse width of the reset signal following a transition by the switching transistor, the low going pulses being shorter than the time constant of the RC charging circuit of the differentiator such that said low going pulses are blocked by the differentiator.

13. The contactor circuit arrangement according to claim 10, wherein the contactor circuit is resettable by coupling the trip output to a reset input of the contactor circuit, and wherein the reset circuit is coupled between the trip output and the reset input of the contactor.

14. The contactor circuit arrangement according to claim 13, wherein the decoder circuit comprises a counter, the trip signal being coupled to a clock input of the counter, the trip signal being coupled to a clock input of the counter, and the clock input being triggered by a transition opposite the leading transition to advance the counter, whereby the counter accumulates a count of pulses of the trip signal following the leading transition.

15. The contactor circuit arrangement according to claim 10, wherein the decoder circuit is responsive to edges of the pulses, and wherein the means responsive to the decoder circuit comprises visible indicators driven from outputs of the decoder circuit.

16. The contactor circuit arrangement according to claim 10, further comprising a series diode coupled between the trip signal and the supply voltage of the capacitor coupled in parallel with the trip signal, whereby said capacitor is blocked from discharging during the low going pulses.

17. The contactor circuit arrangement according to claim 16, wherein the outputs of the decoder circuit define a plurality of distinct bits and each of the bits indicates a distinct trip status.

18. A method for providing a remote trip status signalling in a contactor circuit, comprising:
    sensing a fault condition in a power distribution circuit having a contactor, and providing a trip signal having an initial high level upon commencement of signalling and a predetermined number of low going pulses having at least two distinct durations, the low going pulses encoding a status of the contactor circuit;
    resetting a decoder upon a low going pulse on the trip signal having a longer of the two distinct durations;
    decoding from the trip signal after the reset condition, via the decoder, at least one parameter from subsequent pulses having a shorter of the two distinct durations.

19. The method of claim 18, further comprising disabling decoding of the reset condition for a minimum time following low going transitions of the trip signal.

20. The method of claim 19, wherein said decoding of the parameter comprises counting transitions in the trip signal using a resettable counter, said decoding of the reset condition comprising applying a reset pulse to the resettable counter, and further comprising limiting a pulse width of the reset pulse to enable the resettable counter to accumulate a count of subsequent transitions of the trip signal.

* * * * *